(No Model.)
W. C. GILHAM.
FRUIT EVAPORATOR.
No. 484,910. Patented Oct. 25, 1892.
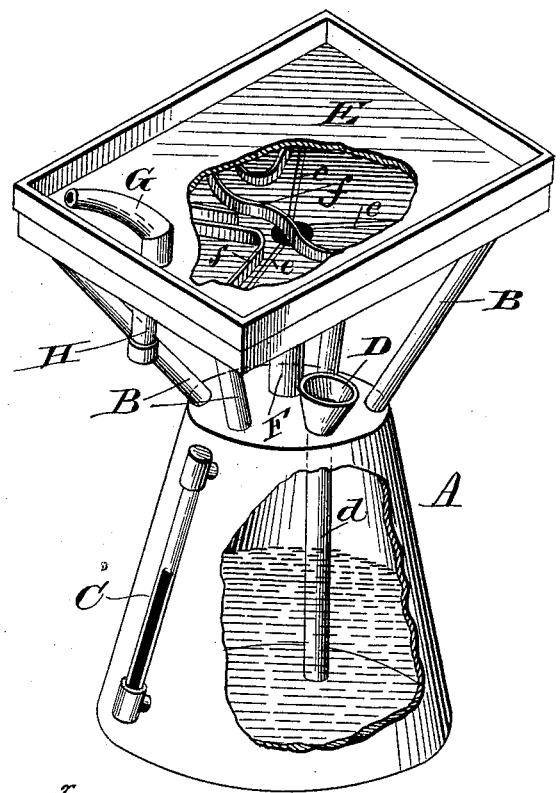
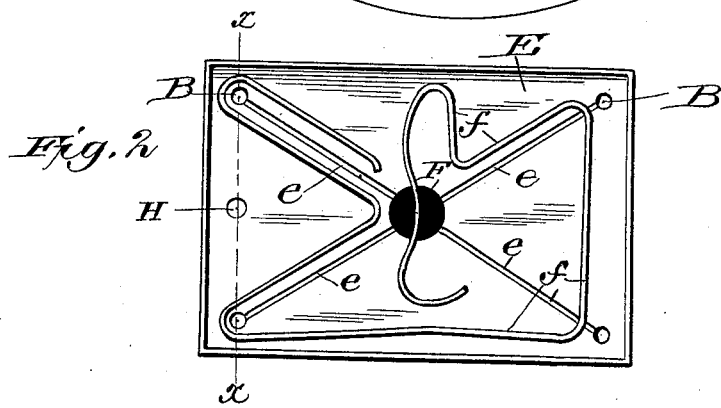
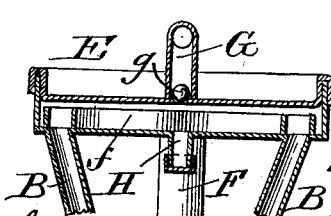
WITNESSES
J. L. Ouraud.
Van Buren Hillyard.
INVENTOR
William C. Gilham.
By R. S. & A. P. Lacey
HIS Attorneys

UNITED STATES PATENT OFFICE.

WILLIAM CLARENCE GILHAM, OF MORRISTOWN, OHIO, ASSIGNOR TO JOHN V. FISHER, OF SAME PLACE.

FRUIT-EVAPORATOR.

SPECIFICATION forming part of Letters Patent No. 484,910, dated October 25, 1892.

Application filed March 19, 1891. Serial No. 385,615. (No model.)

*To all whom it may concern:*

Be it known that I, WILLIAM CLARENCE GILHAM, a citizen of the United States, residing at Morristown, in the county of Belmont and State of Ohio, have invented certain new and useful Improvements in Fruit-Evaporators; and I do hereby declare the following to be a full, clear, and exact description of the invention, such as will enable others skilled in the art to which it appertains to make and use the same.

This invention relates to fruit-evaporators, and aims to provide a simple, efficient, and portable device for the purpose specified.

The improvement consists of the novel features, which will be hereinafter more fully described and claimed, and which are shown in the annexed drawings, in which—

Figure 1 is a perspective view of an evaporator embodying my invention, parts being broken away. Fig. 2 is a top plan view of the evaporator-pan, the cover being removed. Fig. 3 is a cross-section of the evaporating-pan about on the line X X of Fig. 2.

The reservoir or steam-generator A is of convenient size and is provided with a series of radiating steam-pipes B and with a sight-gage C on one side to observe the height of the water in the generator. The funnel D is provided with a delivery-tube $d$, which extends to within a short distance of the bottom of the reservoir, the water forming a seal to close the lower end of the said tube. The evaporating-pan E is supported by the steam-pipes B and the return-pipe F. The steam-pipes connect with the pan near the outer edges thereof, and the return-pipe is centrally disposed and is larger than the steam-pipes to permit the return of the condensed water to the reservoir. The evaporating-pan is hollow and its bottom is constructed to carry the water to the return-pipe, having radial channels $e$ for the purpose. The deflecting-strip $f$, projected up vertically from the bottom of the pan to within a short distance of the top thereof, extends in a tortuous path to retard the escape of the condensed water and keep it and the steam within the pan for a greater length of time, thereby utilizing the heat to the best possible advantage. This operation of retarding the escape of the condensed water will be readily understood on reference to Fig. 2 of the drawings. The water of condensation, instead of passing direct to the escape-pipe F, is caused to travel around the strip $f$, thereby compelling the said water to travel a longer distance to reach the pipe F than it would if it had an unobstructed passage. The bottom of the pan being in a horizontal plane and flat, except for the channels $e$, obviously the condensed water will flow from all points of the pan to the pipe F. Of course some water will lodge in the pipe H; but there is no objection to this. The spout G, provided with the ball-valve $g$, permits an escape of steam, so that no explosion can possibly take place. The nozzle H, closed by a screw-cap, permits the discharge of surplus water or such as does not find its exit through the pipe F.

The operation of the invention is as follows: The reservoir is supplied with water through the funnel D and is placed upon a stove. The steam escapes by pipes B to the pan E and heats the same and is condensed therein, the condensed water returning to the vessel through the pipe F. The fruit or substance to be evaporated, dried, or heated is placed in the pan E.

Having thus described my invention, what I claim, and desire to secure by Letters Patent, is—

1. An evaporator consisting of a steam-generator, a hollow shallow pan having its bottom constructed to carry the water of condensation to a central point, upwardly-diverging steam-pipes B, leading from the steam-generator and forming the support for and constructed to supply steam to the said pan, and the pipe F, of larger diameter than the pipes B, connecting the central portion of the pan with the generator and adapted to return the water of condensation to the generator, substantially as described.

2. An evaporator consisting of a steam-generator, a hollow shallow pan having its bottom constructed to deliver the water of condensation to a central opening provided therein and having channels radiating from the said opening, steam-pipes B for supporting the outer portion of the pan and supplying steam thereto, the pipe F, of larger diameter than the pipes B, connected with the bottom of the pan and constructed to support the same at its middle portion and return the water of condensation to the generator, a relief-valve attached to the said pan, and a tortuous deflecting-strip $f$ within the said steam-space, substantially as shown, for the purpose described.

In testimony whereof I affix my signature in presence of two witnesses.

WILLIAM CLARENCE GILHAM.

Witnesses:
JOHN V. FISHER,
JOSEPH McALLISTER.